J. McNAMEE.
TIRE.
APPLICATION FILED SEPT. 30, 1909.

1,084,025.

Patented Jan. 13, 1914.
4 SHEETS—SHEET 1.

Witnesses

Inventor
James McNamee.
By C. A. Snow & Co.
Attorneys

J. McNAMEE.
TIRE.
APPLICATION FILED SEPT. 30, 1909.

1,084,025.

Patented Jan. 13, 1914.

4 SHEETS—SHEET 3.

Witnesses

Inventor
James McNamee.
By C. A. Snow & Co.
Attorneys

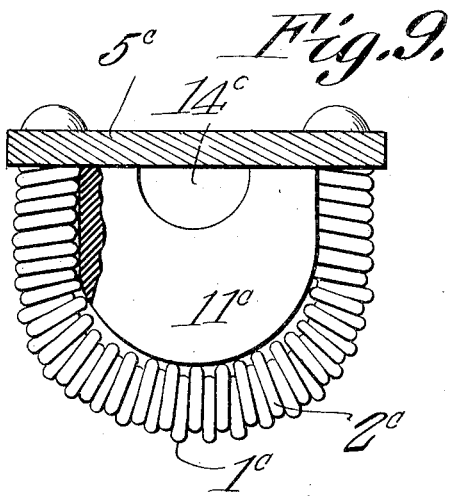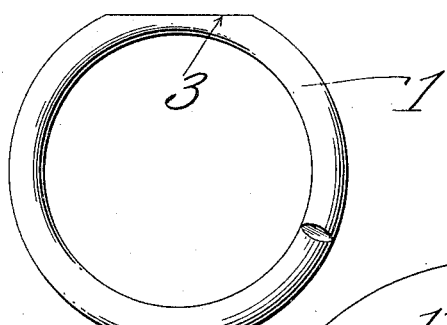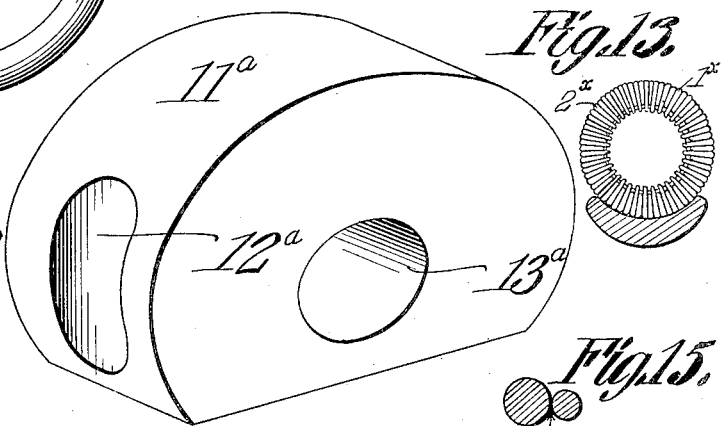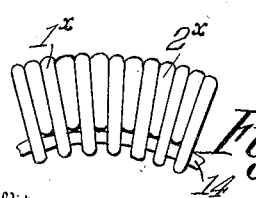

UNITED STATES PATENT OFFICE.

JAMES McNAMEE, OF AMSTERDAM, NEW YORK.

TIRE.

1,084,025.  Specification of Letters Patent.  Patented Jan. 13, 1914.

Application filed September 30, 1909. Serial No. 520,308.

*To all whom it may concern:*

Be it known that I, JAMES MCNAMEE, a citizen of the United States, residing at Amsterdam, in the county of Montgomery and State of New York, have invented a new and useful Tire, of which the following is a specification.

The invention has special reference to tires designed for use in connection with automobiles, bicycles or other vehicles in which pneumatic or cushion tires are ordinarily employed, and the object in view is to produce a highly resilient tire of which the utility cannot be affected or destroyed by puncture, and to this end to provide an elastic or yielding resisting element composed essentially of interwound helices with the parts so disposed that the convolutions of the helices throughout the tread portions of the tire become coactively resistant to pressure or forces tending to distort or displace the same; and to this end the invention consists in the novel construction, combination and arrangement of parts fully illustrated in the accompanying drawing, and hereinafter described and set forth in the appended claims, it being understood that various changes in the form, proportion and minor details of the construction may be made without departing from the spirit or sacrificing any of the advantages of the invention.

Figure 1:
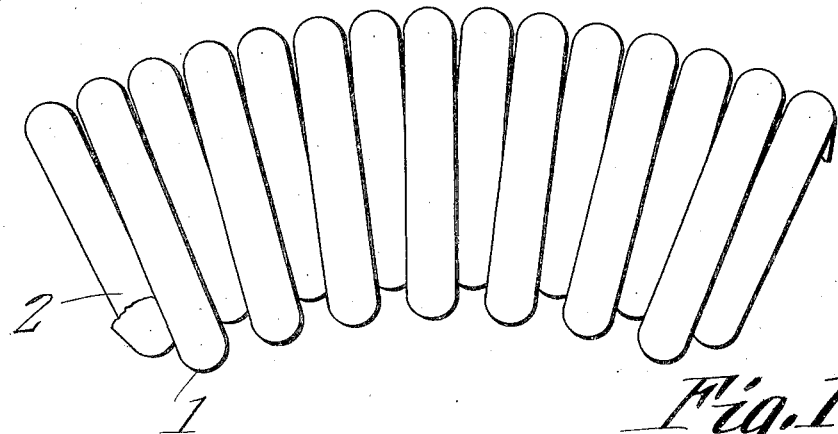
Figure 2:
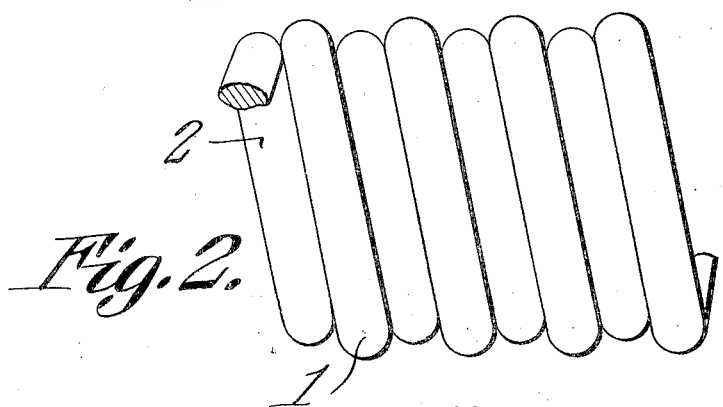
Figure 3:
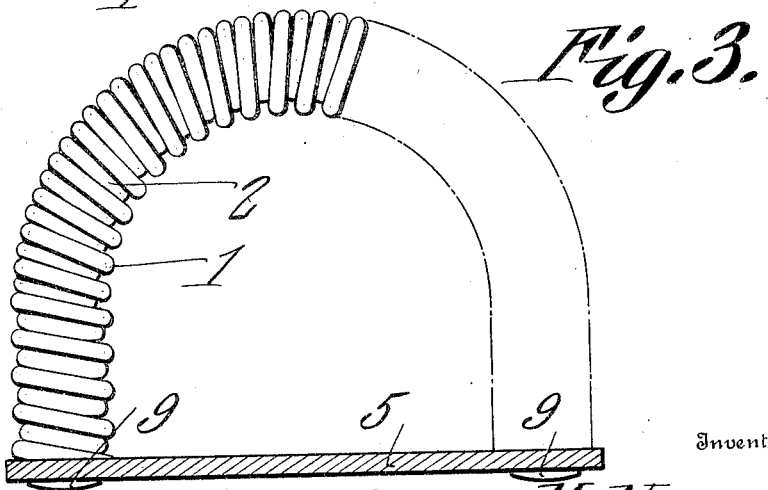
Figure 4:
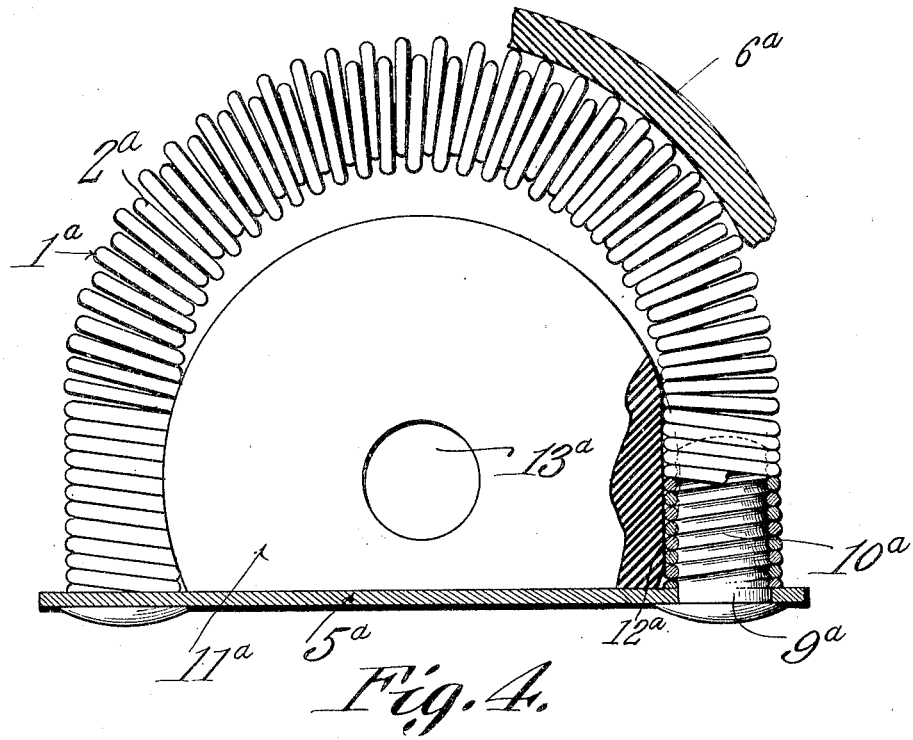
Figure 5:
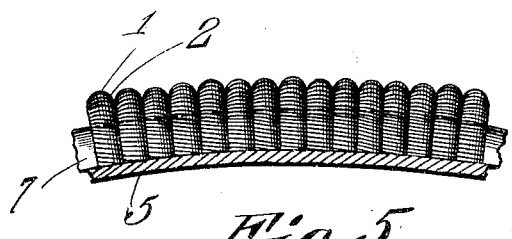
Figure 6:
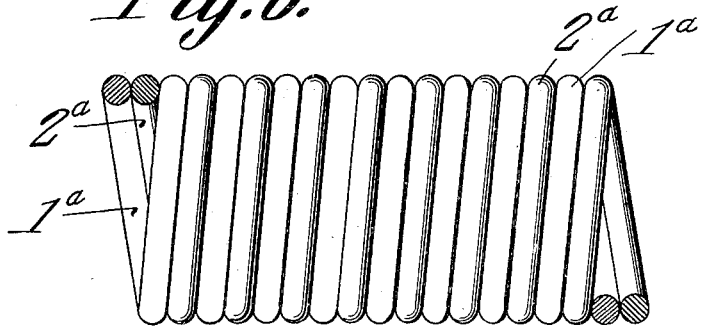
Figure 7:
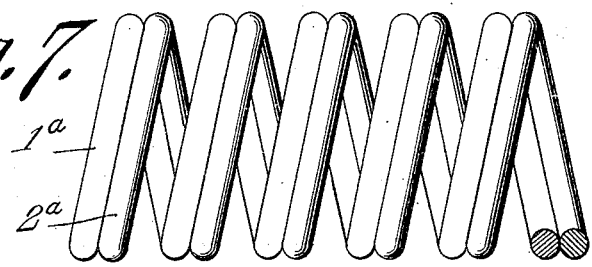
Figure 8:
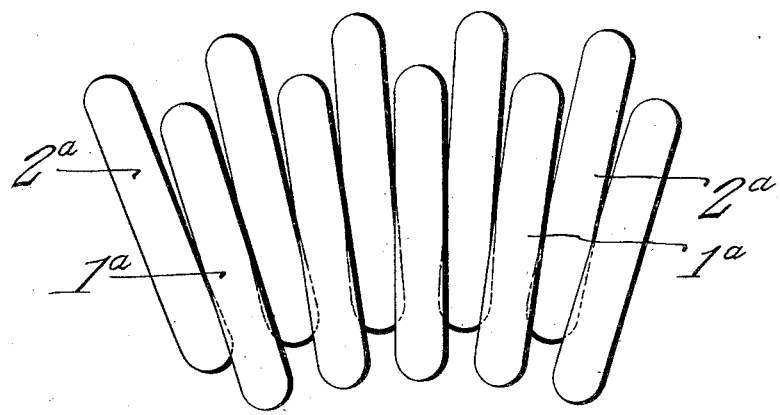

In the accompanying drawing, forming part of this specification, Figure 1 is an elevation of a portion of a tire element composed of helically wound strands or helices wherein one helix is of smaller diameter than the other, said element being bent to form a curve, and thereby relatively to displace or render non-coincident the axes of the helices. Fig. 2 is an elevation of the same element prior to the bending, and therefore showing the helices of different diameters with their axes in coincidence. Fig. 3 is an elevation of a complete tire element as applied to a rim. Fig. 4 is a cross sectional view of a tire showing a modified embodiment of the invention wherein the interwound helices are of the same diameter. Fig. 5 is a side elevation of a portion of a tire constructed in accordance with the invention, the casing or shoe being omitted. Fig. 6 is an elevation of a portion of a tire element such as that illustrated in Fig. 4 with the helices of equal diameters, the helices being shown in the relative positions which they occupy prior to the curving of the element. Fig. 7 is an elevation of the structure illustrated in Fig. 6, as it would appear if extended longitudinally. Fig. 8 is an elevation showing the disposition of the helices of Fig. 6 when the element is bent to form a curve or arc, as shown in Fig. 4. Fig. 9 is a sectional view similar to Fig. 4 illustrating a different construction of filling block. Fig. 10 is an end view of a helix showing the tread portion flattened. Fig. 11 is a cross section through a form of strand which may be used in the construction of the helices. Fig. 12 is a perspective view of a filling block such as that illustrated in Fig. 4. Fig. 13 is a cross sectional view of a rim with a circular tire element arranged in operative position with relation thereto. Fig. 14 is a side view of a portion of a tire wherein a retaining rod or bar is extended between the inner sides of the coils of the helices, and Fig. 15 is a cross section showing a modification.

In the preferred embodiment of the invention, the tire element illustrated, for example in Fig. 3, is composed essentially of helices 1 and 2, of any suitable material, such as steel, phosphor bronze, or the like, the helices being either of the same or different materials as may be found expedient and of wire which is either of the same gage, or of different gages as shown at 25 in Fig. 15. Moreover, said helices may be of different diameters as shown in Figs. 1 to 3 inclusive or may be of the same diameter as shown by numerals 1ª and 2ª in Figs. 4, 6, 7 and 8. Whether of the same or different diameters, however, the helices are primarily positioned with reference to each other, as shown respectively in Figs. 2 and 6, with the axes of the helices mutually included or in other words with the axis of each helix included within the space inclosed and bounded by the other helix and with said axes of the helices in coincident relation. Moreover, the helices are by preference terminally retained in such co-axial or axially coincident relation as shown in Figs. 3, 4 and 9. With the helices positioned relatively as indicated in Figs. 2 and 6, the element is bent to form an arc or curve as shown in Figs. 1 and 8 respectively, thereby relatively displacing the axes of the helices or rendering them axially non-coincident at their intermediate portions.

If the terminals of the helices are held in coaxial or axially coincident relation, displacement of the axes of the helices occurs only at the intermediate portion due to the tendency of the coils at the inner side of the bend to crowd together and thereby push one of the helices outward or away from the center of the bend or curve, and when the diameter of the smaller helix, as shown in Figs. 1 to 3 inclusive, is less than that of the larger helix, only to the extent of the diameter of the wire or stock of which the helices are formed, the exterior surfaces of the convolutions at the outer or convex portion of the arc or curve of the element will be substantially coincident, as shown in Figs. 1 and 3, while the inner portions of the convolutions of the smaller helix will lie just inside of the inner portions of the convolutions of the larger helix with the inner portion of the larger helix substantially coincident with the outer portion of the smaller helix, as also shown in Figs. 1 and 3. When, however, the helices are of the same diameter, as shown in Figs. 6 to 8 inclusive, this outward displacement of one helix will position the convolutions at the inner or convex portion of the arc or curve, as described with reference to Figs. 1 and 3, with the inner portions of the convolutions at the concave or inner side of the element displaced, the convolutions of one helix within the convolutions of the other helix, while at the outer or convex side of the element the convolutions will be intercurrently arranged and in mutual contact, but with the convolutions of one helix projecting beyond the convolutions of the other helix. In both of the illustrated forms of the element, as shown respectively in Figs. 1 and 8, however, the intercurrent and mutually contacting relation of the convolutions of the two helices at the outer or convex side of the element provides for a mutual resistance of the helices at the tread portion of the tire element without relative radial movement of the convolutions, and, therefore, without producing friction which would result in such a heating of the parts as would be injurious to an enveloping cover, casing, or shoe. Pressure applied to the tread of a tire thus formed will not cause either the condensing of the convolutions at the tread portion, or the radial displacement or movement of the convolutions at the tread portion, but will produce a general or bodily inward movement of the tread portion with a corresponding outward flexing of the tire elements at the sides, or at the points between said tread portions and the points of attachment of the elements to the rim of the wheel, which in Fig. 3 is illustrated at 5, and in Fig. 4 at $5^a$.

The tread portions of the convolutions of the helices may be exteriorly flattened as shown at 3 in Fig. 10 and by the cross section of the wire 4 in Fig. 11.

In the form of the invention illustrated in Figs. 3, 4 and 9 comparatively short tire elements are employed, the same being arranged in substantially U-form and these elements are adapted to be arranged side by side to form a substantially unbroken or complete tread as shown in Fig. 5, but as illustrated in Fig. 13, the elements composing the tire may be of circular form with the helices $1^x$ and $2^x$ arranged as hereinbefore described, and when larger and smaller helices are employed in which the difference in diameters is sufficient, a retaining element consisting of a bar or rod 14 (as shown in Fig. 14) may be extended through the elements so that the inner sides of the convolutions of the helix of smaller diameter will bear against the outer side thereof while the retaining member will rest against the inner sides of the convolutions of the helix of larger diameter. As will be observed from the foregoing description of the form illustrated in Figs. 1 to 3 inclusive, a retaining member is not required where the difference between the diameters of the smaller and larger helices is such that the inner portions of the convolutions of the larger helix will serve to prevent inward displacement of the convolutions of the smaller helix, when pressure is applied to the tread of the tire.

When the resilient units or elements of the tire are of the U-shape illustrated in Fig. 3 the terminals of the legs of the U may be secured to the rim 5 by studs 9, as shown in Fig. 3, or similar studs $9^a$ as shown in Fig. 4 may be provided with coarse threads 10 designed to inclose and hold the convolutions of the helices although of course the studs may be smooth and other fastening means employed. Moreover, filling blocks may be employed within the arched elements as shown in Fig. 4 at $11^a$ and in Fig. 9 at $11^c$, said block $11^a$ having a perforation $13^a$ to render the same more yielding. Said block $11^a$ rests upon the rim $5^a$ and is spaced at its outer curved portion from the tread portion of the elastic or yielding element, and the tire casing or shoe $6^a$ is extended over the latter and may be of any suitable or preferred construction.

In the form of invention illustrated in Fig. 9 wherein the tire element is composed of the helices $1^c$ and $2^c$, the element being secured terminally to the rim $5^c$, the filling block is provided in the side adjacent to said rim with an opening $14^c$ for a purpose similar to that described with reference to the opening 13ᵃ in Fig. 4. Moreover, the block 11ᵃ, as illustrated in Fig. 12 (and also in section in Fig. 4) may be provided in its sides with depressions or grooves 12ᵃ to receive the legs of the U-shaped elements and thereby lock said block in place to prevent relative displacement. It will be noted that a filling ring may be constructed in like manner to extend continuously around the rim of a wheel, instead of employing separate blocks as shown.

From the foregoing description, it will be noted that each elastic longitudinally curved element of the tire consists of the helices of which the axes are mutually included, or in other words, in which the axis of each helix is included within the space and inclosed and bounded by the other helix, or other helices (if more than two are employed) and while the helices are preferably co-axial or axially coincident at their terminals, they are intermediately non-axial or axially non-coincident, in order to intercurrently dispose the intermediate convolutions at the outer or tread side of the curve of the element, and moreover, that the intercurrent portions of the convolutions are mutually contacting and are non-movable radially. The advantages thereby secured are as hereinbefore indicated, that is, the tire is non-puncturable or is not injured by puncture of the outer casing or shoe, while the relative arrangement of the parts of the elements is such as to prevent the generation of heat which would destroy the efficiency of a casing or shoe composed of or including rubber in its composition. Moreover, where the elements are composed of helices having their convolutions intercurrently arranged at the tread portion, with the outer surfaces or sides of the tread portions of the convolutions coincident, as for instance by employing helices of different diameters, a smooth tread is provided and the inward relative displacement of the convolutions under strain or pressure is prevented.

What is claimed is:

1. In a tire, an elastic longitudinally curved element comprising separate helices having non-coincident mutually included axes, and intercurrent convolutions.

2. In a tire, an elastic longitudinally curved element comprising separate helices having non-coincident mutually included axes and intercurrent convolutions which are exteriorly coincident.

3. In a tire, an elastic longitudinally curved element comprising separate helices having intercurrent convolutions, said helices being terminally co-axial and intermediately non-axial.

4. In a tire, an elastic longitudinally curved element comprising separate terminally co-axial helices having their convolutions intercurrent at one side of the curve.

5. In a tire, an elastic longitudinally curved element comprising separate terminally co-axial helices having their convolutions intercurrent at the outer or tread side of the curve.

6. In a tire, an elastic element formed of separate helices of different diameters having their longitudinal axes displaced one relative to the other, and curved to form an arc with the convolutions of the helices at the convex portion of the element at the same distance from the axis of curvature of the arc.

In testimony that I claim the foregoing as my own, I have hereto affixed my signature in the presence of two witnesses.

JAMES McNAMEE.

Witnesses:
  DANIEL V. McNAMEE,
  C. E. DOYLE.

Copies of this patent may be obtained for five cents each, by addressing the "Commissioner of Patents, Washington, D. C."